US012602213B2

(12) United States Patent (10) Patent No.: US 12,602,213 B2

Ayers (45) Date of Patent: Apr. 14, 2026

(54) SCALABLE APPROXIMATE COUNTING

(71) Applicant: Microsoft Technology Licensing, LLC, Redmond, WA (US)

(72) Inventor: Andrew Edward Ayers, Newport, OR (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 218 days.

(21) Appl. No.: 18/199,486

(22) Filed: May 19, 2023

(65) Prior Publication Data

US 2024/0329956 A1 Oct. 3, 2024

Related U.S. Application Data

(60) Provisional application No. 63/455,704, filed on Mar. 30, 2023.

(51) Int. Cl.
G06F 9/445 (2018.01)
G06F 8/41 (2018.01)
(52) U.S. Cl.
CPC .................................... G06F 8/443 (2013.01)
(58) Field of Classification Search
CPC .. G06F 9/44; G06F 9/45; G06F 9/325; H03K 21/40
See application file for complete search history.

(56) References Cited

U.S. PATENT DOCUMENTS

| | | | | |
|---|---|---|---|---|
| 8,136,124 B2 * | 3/2012 | Kosche | ............... | G06F 11/3447 |
| | | | | 714/48 |
| 9,069,629 B2 * | 6/2015 | Frazier | .................. | G06F 11/348 |
| 2004/0228197 A1 | 11/2004 | Mokhlesi | | |
| 2014/0181827 A1 | 6/2014 | Dice | | |
| 2017/0177482 A1 * | 6/2017 | Greenspan | .......... | G06F 12/0815 |

OTHER PUBLICATIONS

Ball, et al., "Optimally Profiling and Tracing Programs", In Journal of ACM Transactions on Programming Languages and Systems, vol. 16, Issue 4, Jul. 1, 1994, pp. 1319-1360.
Dice, et al., "Scalable Statistics Counters", In Proceedings of the twenty-fifth annual ACM symposium on Parallelism in algorithms and architectures, Jun. 23, 2013, 10 Pages.

(Continued)

*Primary Examiner* — Chuck O Kendall
(74) *Attorney, Agent, or Firm* — Workman Nydegger

(57) ABSTRACT

Techniques for implementing an intentionally approximate counting scheme are disclosed. A code counter is accessed. The counter updates a count that is approximately representative of a number of times the code is called. The counter operates in a first mode where the counter updates the count by a value of 1 and where a probability by which the counter updates the count is set to a value of 1. The counter switches from operating in the first mode to operating in a second mode. The counter now updates the count by a value of N, where N is an integer larger than 1. The probability by which the counter updates the count is set to a value of 1/N such that, despite multiple calls being made to the code, the count is updated in accordance with the 1/N probability. The counter continues to update the count.

20 Claims, 12 Drawing Sheets

(56)     References Cited

OTHER PUBLICATIONS

Hofer, Viktor, "Dynamic PGO", Retrieved From: https://github.com/dotnet/runtime/blob/main/docs/design/features/DynamicPgo.md, Oct. 26, 2022, 18 Pages.

Morris, et al., "Counting large numbers of events in small registers", In Journal of Communications of the ACM, vol. 21, Issue 10, Oct. 1, 1978, pp. 840-842.

U.S. Appl. No. 63/455,704, filed Mar. 30, 2023.

International Search Report and Written Opinion received for PCT Application No. PCT/US2024/019473, Jul. 8, 2024, 17 pages.

Mitchell, et al., "Flexible Approximate Counting," Proceedings of the 15th Symposium on International Database Engineering & Applications, Ideas, Jan. 1, 2011, pp. 233-239.

International Preliminary Report on Patentability (Chapter I) received for PCT Application No. PCT/US2024/019473, Oct. 9, 2025, 11 pages.

* cited by examiner

Program Flow Diagram
200

```
Start
205

Process
210

Process
215

Process
220

Process
225

Process
230

Process
235

End
240
```

*Figure 2A*

Program Flow Diagram
200

Chart
400

Sum of rMean
Sum of Min
Sum of Max

Sum Of Min –
Scalable
415

Sum Of Max –
Interlocked
410

Sum Of Max –
Scalable
405

Sum Of Max –
Racy
420

Sum Of rMean –
Racy
425

Sum Of Min –
Racy
430

Count

Chart
600

| Metric (Tier0 instr) | Racing | Scalable | |
|---|---|---|---|
| First Request (ms) | 155 | 155 | +0.22% |
| Requests/sec | 223,665 | 352,592 | +57.64% |
| Requests | 3,372,373 | 5,308,812 | +57.42% |
| Mean latency (ms) | 10.60 | 7.83 | -26.08% |
| Max latency (ms) | 237.25 | 279.12 | +17.65% |
| Read throughput (MB/s) | 34.77 | 54.81 | +57.64% |
| Latency 50th (ms) | 10.03 | 6.68 | -33.42% |
| Latency 75th (ms) | 14.69 | 9.70 | -33.98% |
| Latency 90th (ms) | 17.65 | 11.76 | -33.38% |
| Latency 99th (ms) | 29.59 | 0.00 | |

Table
800

*Figure 8*

| Metric (Tiered PGO) | Racing | Scalable | |
|---|---|---|---|
| First Request (ms) | 90 | 89 | -1.12% |
| Requests/sec | 3,083,453 | 3,187,157 | +3.36% |
| Requests | 46,558,728 | 48,125,121 | +3.36% |
| Mean latency (ms) | 0.97 | 0.92 | -4.61% |
| Max latency (ms) | 98.20 | 109.77 | +11.77% |
| Read throughput (MB/s) | 479.32 | 495.44 | +3.36% |
| Latency 50th (ms) | 0.76 | 0.74 | -2.76% |
| Latency 75th (ms) | 1.08 | 1.05 | -2.77% |
| Latency 90th (ms) | 1.30 | 1.28 | -2.05% |
| Latency 99th (ms) | 0.00 | 0.00 | |

Table
900

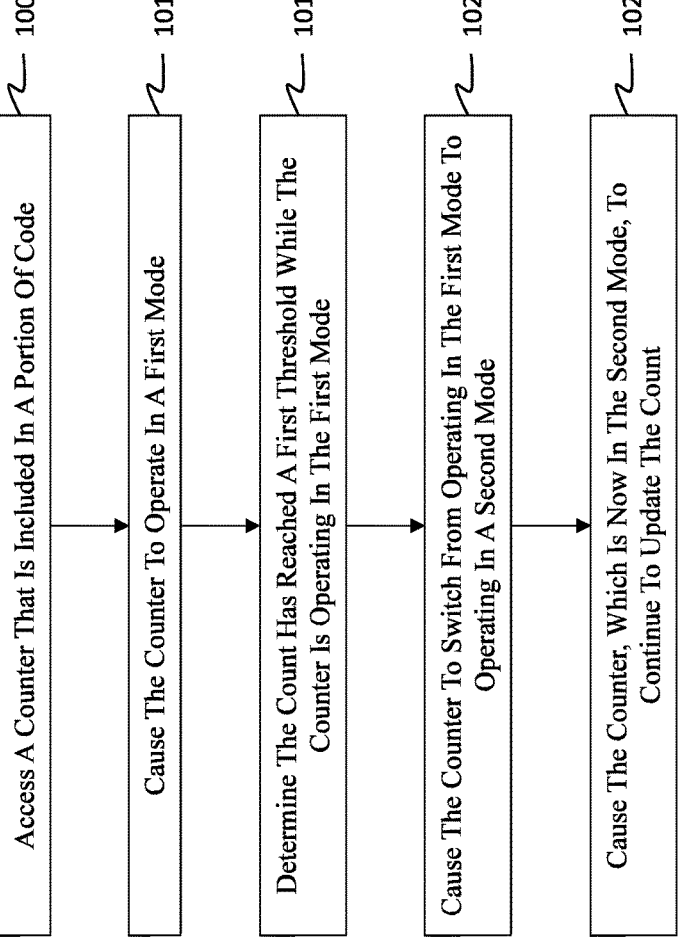

Access A Counter That Is Included In A Portion Of Code ⟿ 1005

Cause The Counter To Operate In A First Mode ⟿ 1010

Determine The Count Has Reached A First Threshold While The Counter Is Operating In The First Mode ⟿ 1015

Cause The Counter To Switch From Operating In The First Mode To Operating In A Second Mode ⟿ 1020

Cause The Counter, Which Is Now In The Second Mode, To Continue To Update The Count ⟿ 1025

*Figure 10*

SCALABLE APPROXIMATE COUNTING

CROSS-REFERENCE TO RELATED APPLICATIONS

This application claims the benefit of and priority to U.S. Provisional Patent Application Ser. No. 63/455,704 filed on Mar. 30, 2023 and entitled "SCALABLE APPROXIMATE COUNTING," and which application is expressly incorporated herein by reference in its entirety.

BACKGROUND

There are many tools available to develop a software application. For instance, an integrated development environment (IDE) is one tool that helps developers program code. There are also various different graphical user interfaces that are available to assist in the process.

In addition to simply developing features for an application, developers are often tasked with making an application run more efficiently on a computer system. For example, it is often desirable to improve the performance of an application through various optimization techniques.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

In some aspects, the techniques described herein relate to a computer system that implements an intentionally approximate counting scheme, said computer system including: a processor system; and a storage system that stores instructions that are executable by the processor system to cause the computer system to: access a counter that is included in a portion of code, wherein the counter is structured to update a count that is approximately representative of a number of times the code portion is called or executed; cause the counter to operate in a first mode, wherein the first mode is a mode in which the counter updates the count by a value of 1, and wherein, while the counter is operating in the first mode, a probability by which the counter updates the count is set to a value of 1 such that the counter updates the count each time the code portion is called or executed; determine the count has reached a first threshold while the counter is operating in the first mode; cause the counter to switch from operating in the first mode to operating in a second mode, wherein the second mode is a mode in which the counter updates the count by a value of N, where N is an integer larger than 1, and wherein, while the counter is operating in the second mode, the probability by which the counter updates the count is set to a value of 1/N such that, despite multiple calls being made to the code portion, the count is updated in accordance with the 1/N probability; and cause the counter, which is now in the second mode, to continue to update the count, wherein the count is updated in accordance with the 1/N probability, and wherein the counter updates the count by the value of N.

In some aspects, the techniques described herein relate to a method for implementing an intentionally approximate counting scheme, said method including: accessing a counter that is included in a portion of code, wherein the counter is structured to update a count that is approximately representative of a number of times the code portion is called or executed; causing the counter to operate in a first mode, wherein the first mode is a mode in which the counter updates the count by a value of 1, and wherein, while the counter is operating in the first mode, a probability by which the counter updates the count is set to a value of 1 such that the counter updates the count each time the code portion is called or executed; determining the count has reached a first threshold while the counter is operating in the first mode; causing the counter to switch from operating in the first mode to operating in a second mode, wherein the second mode is a mode in which the counter updates the count by a value of N, where N is an integer larger than 1, and wherein, while the counter is operating in the second mode, the probability by which the counter updates the count is set to a value of 1/N such that, despite multiple calls being made to the code portion, the count is updated in accordance with the 1/N probability; and causing the counter, which is now in the second mode, to continue to update the count, wherein the count is updated in accordance with the 1/N probability, and wherein the counter updates the count by the value of N.

In some aspects, the techniques described herein relate to a method for implementing an intentionally approximate counting scheme, said method including: accessing a counter that is included in a portion of code, wherein the counter is structured to update a count that is approximately representative of a number of times the code portion is called or executed; causing the counter to operate in a first mode, wherein the first mode is a mode in which the counter updates the count by a value of 1, and wherein, while the counter is operating in the first mode, a probability by which the counter updates the count is set to a value of 1 such that the counter updates the count each time the code portion is called or executed; determining the count has reached a first threshold while the counter is operating in the first mode; causing the counter to switch from operating in the first mode to operating in a second mode, wherein the second mode is a mode in which the counter updates the count by a value of N, where N is an integer larger than 1, and wherein, while the counter is operating in the second mode, the probability by which the counter updates the count is set to a value of 1/N such that, despite multiple calls being made to the code portion, the count is updated in accordance with the 1/N probability; causing the counter, which is now in the second mode, to continue to update the count, wherein the count is updated in accordance with the 1/N probability, and wherein the counter updates the count by the value of N; and writing, each time the count is updated, a value of the count to a storage system.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more

Figure 1:
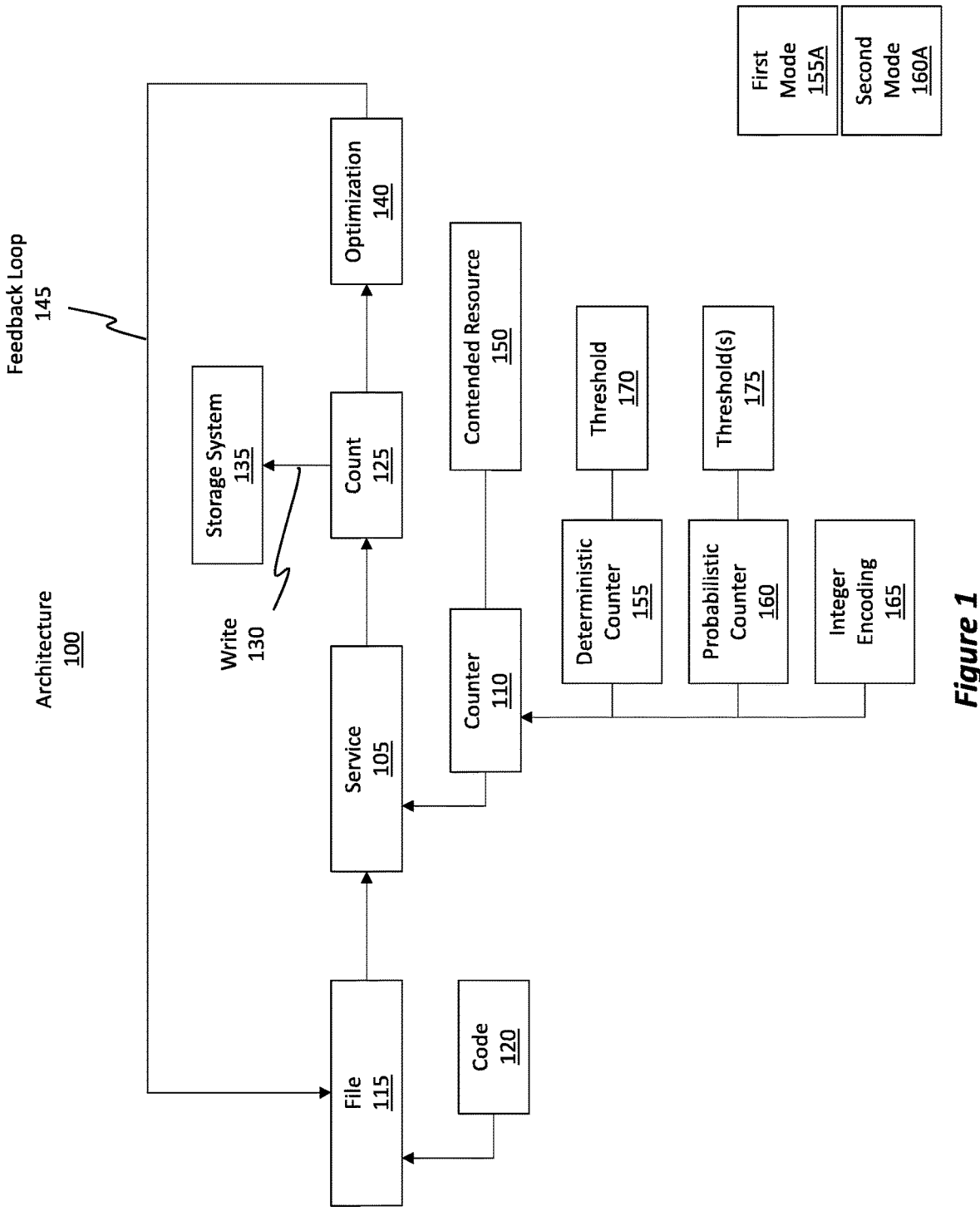

3 particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which:

FIG. 1 illustrates an example architecture for implementing a counter capable of operating in multiple different modes.

Figure 2A:
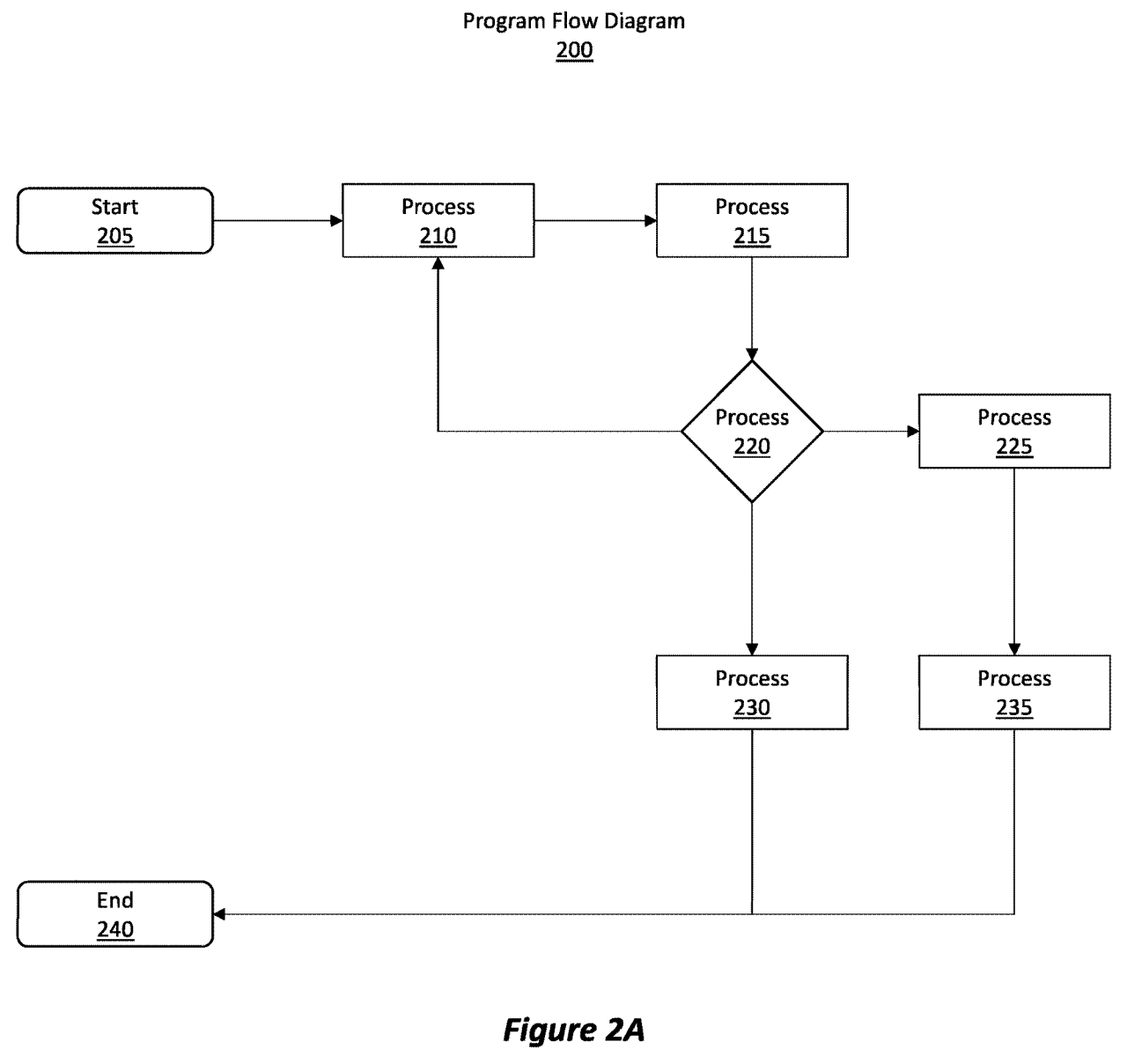
Figure 2B:
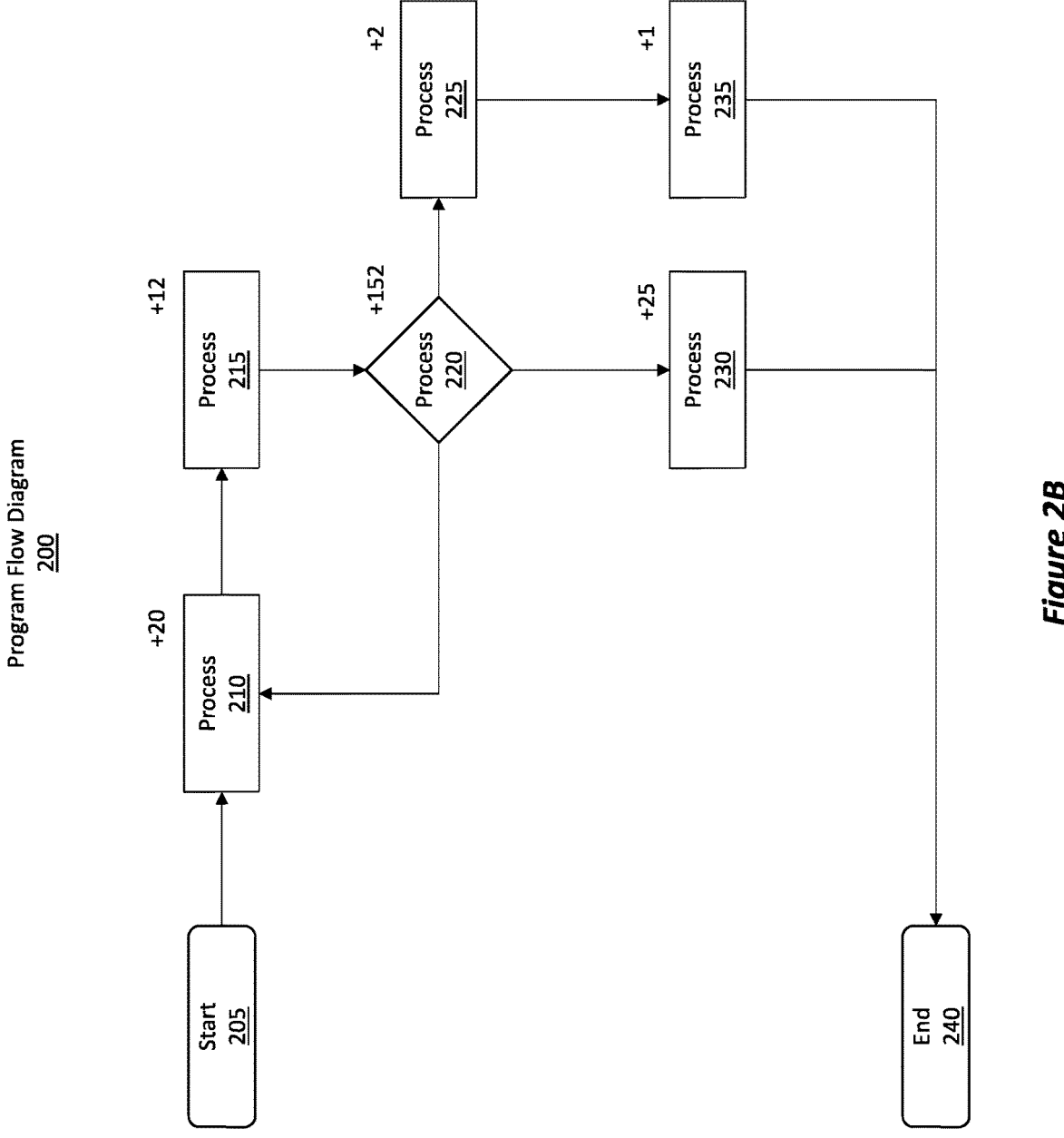

FIGS. 2A and 2B illustrate an example of a program flow diagram.

Figure 3:
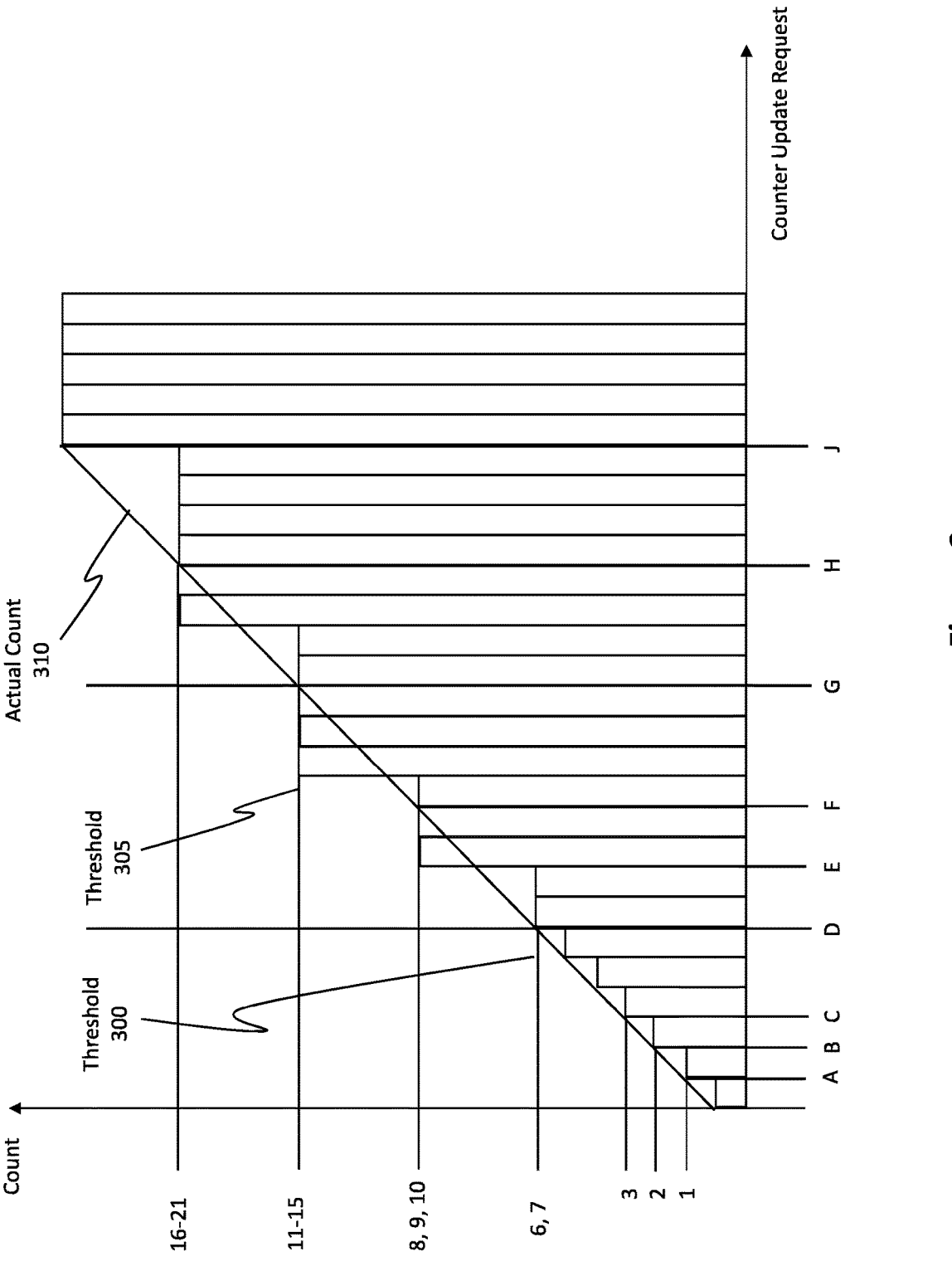

FIG. 3 illustrates a chart showing the different operational modes of the counter.

FIGS. 4, 5, 6, and 7 illustrate various different charts outlining the operational characteristics of the disclosed counter.

FIGS. 8 and 9 illustrate various different metrics for the disclosed counter.

FIG. 10 illustrates a flowchart of an example method for implementing an intentionally approximate counting scheme.

Figure 11:
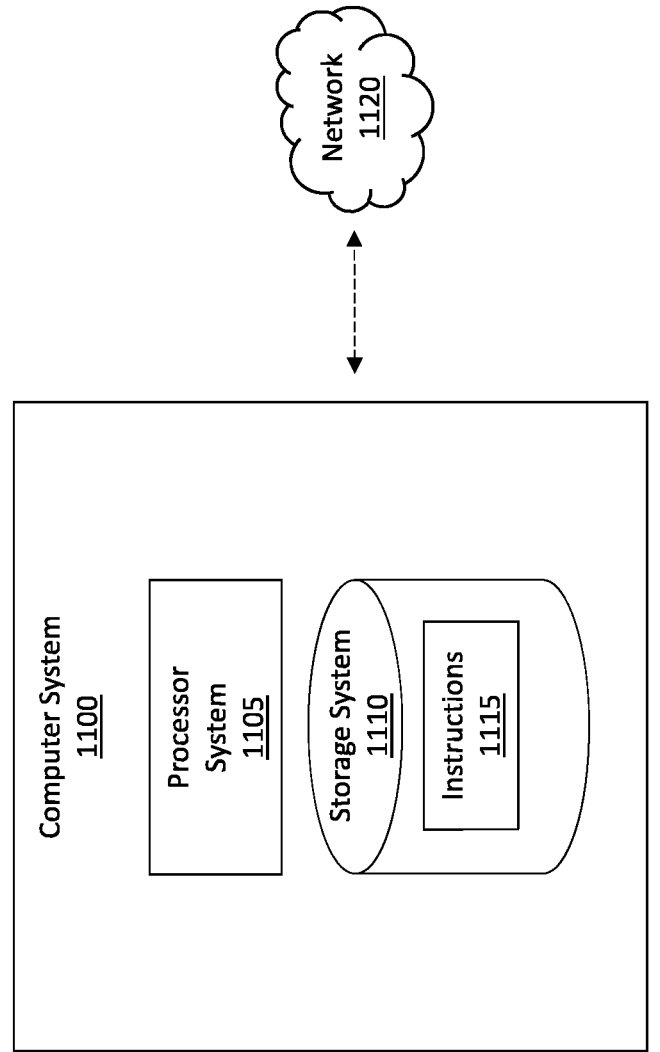

FIG. 11 illustrates an example computer system that can be configured to perform any of the disclosed operations.

DETAILED DESCRIPTION

When developing code, developers often have to provide solutions for various behaviors that might possibly occur during runtime even though most of the time those behaviors do not occur. Thus, a significant amount of the code is actually directed to covering scenarios that might not happen on a frequent basis. When optimizing code, developers usually want to focus their efforts on the portions of code that are called or used most frequently. Less used code snippets or portions may not need to be optimized simply due to the fact that they are not called on a frequent basis.

Dynamic profile-guided optimization (PGO) is a technique for collecting additional information about how a program is executing. That additional information can then be used by a developer or runtime system to help optimize the program. Dynamic PGO typically works by instrumenting early versions of methods (e.g., Tier0 codegen) to produce a profile data set that the just in time (JIT) component can use to optimize subsequent versions of those methods (e.g., Tier1 codegen).

When optimizing code (e.g., such as by using Dynamic PGO), developers and runtime systems will typically focus on the code that will be implemented most often during runtime. One way for determining which code or code segments are executed most frequently is through the use of a so-called "counter" or "counter based instrumentation." With Dynamic PGO enabled, the JIT is able to add code to each Tier0 method to count how often the parts of the methods execute. Doing so allows the optimization process to then focus on the parts of the method that seem to be the most important for performance.

From the outset, Dynamic PGO has used fairly simplistic methods of counting. For example, for each distinct counter, the code the JIT adds to the program will simply increment a shared memory location. This aspect of counting is referred to herein as the "counter implementation," and this particular way of counting is referred to as the "racing" implementation. The JIT tries to be a bit more sophisticated with counter placement, relying on an approach to try to reduce the total number of counters needed to a minimum and to place them in optimal locations.

Recently, two surprising observations about racing were discovered; the first being a measurement observation. Specifically, various tests were performed to measure the runtime costs of counting in heavily multithreaded applications by simply forcing these to run only the Tier0 instrumented code. It was observed that compared to un-instrumented Tier0 code, instrumented code was slower by a factor of 2, 3, or sometimes even more than 3. Some further experimentation revealed that cache contention (e.g., both true and false sharing) was a major contributor to the high instrumentation overhead.

The second discovery related to an accuracy measurement. Specifically, various tests were performed to look at how accurate the counts were in the Tier1 compilation. The results of the tests revealed widespread inaccuracies. The major contributor here was lost counter updates because of the unsynchronized access across many threads of execution. This was doubly bad news. For instance, not only was the system paying a significant amount at runtime for the racing counter implementation, but it was also performing poorly with regard to the actual count.

One potential fix for the lost counter updates is to stop racing and start synchronizing the updates. Various platforms can provide atomic counter updates in the form of "InterlockedIncrement" and similar, and the JIT can emit the proper machine code forms (e.g., say lock inc[mem]) that lay at the heart of these in place of the unsynchronized (e.g., inc [mem]) racing variant. This new version is referred to as the "interlocked" implementation scheme for a counter. The JIT can be updated to emit this variant and to make various measurements.

Stated differently, the "interlocked" implementation essentially requires synchronization for the counter updates. If one processor updates the counter, then all other updates to the counter are delayed until the one processor finishes its use of the counter. Interlocked largely fixes the accuracy problem that was previously observed, but it creates even more runtime overhead. So while it could serve as a component of a solution, it also has drawbacks. What is needed, therefore, is an improved technique for performing counting.

The disclosed embodiments bring about numerous benefits, advantages, and practical applications to the field of code optimization. Code optimization relies on count information that indicates how often a program or program portion is being called or executed.

In particular, the embodiments provide an improved counter that reduces the amount of computational overhead that has historically been involved in counting. This counter is structured to provide a high level of accuracy while also reducing the number of file system or memory write events that occur, thereby further reducing the overhead. The disclosed counter operates in one of two modes. Initially, the counter operates in a first or deterministic mode in which the counter updates the count each time a corresponding portion of code is executed. Later, the counter switches to a second or probabilistic mode in which the counter updates the count by a value of N, where N is an integer larger than 1. The probability by which the counter updates the count is set to a value of $1/N$. Therefore, it is not necessarily the case that the counter is triggered to update the count each time the code portion is executed. In doing so, the embodiments are able to reduce the number of times the count is updated and reduce the number of times the count is written to the file system or memory.

By performing the disclosed processes, the embodiments also facilitate the generation of improved and optimized code. That is, the embodiments are able to detect how a program operates, and then, using that information, the embodiments can facilitate or direct the generation of optimized code. For instance, using the disclosed counter, the embodiments are able to determine which code portions or snippets are being called or executed most frequently. These code portions can then be identified based on their respective counts. Special emphasis can then be directed to these frequently executed code portions so that they can be optimized. In this manner, the embodiments beneficially provide an in-process feedback loop in which frequently executed code portions can be identified and then subjected to optimization. Accordingly, these and many other benefits will now be described in more detail throughout the remaining portions of this disclosure.

Example Architectures

Having just described some of the various benefits of the disclosed embodiments, attention will now be directed to FIG. 1, which illustrates an example architecture 100 that implements an approximately correct counter having relatively low overhead while also having scalability properties. As will be described in more detail later, the counter's accuracy can be dynamically tuned by trading off some of the scalability benefits. The counting process uses minimal runtime state, such as one random number generator (RNG) per physical thread, plus one storage location per counter. The value of the counter is readily available without any post-processing.

Architecture 100 is shown as including a service 105. As used herein, the term "service" refers to an automated program that is tasked with performing different actions based on input. In some cases, service 105 can be a deterministic service that operates fully given a set of inputs and without a randomization factor. In other cases, service 105 can be or can include a machine learning (ML) or artificial intelligence engine.

As used herein, reference to any type of machine learning or artificial intelligence may include any type of machine learning algorithm or device, convolutional neural network(s), multilayer neural network(s), recursive neural network(s), deep neural network(s), decision tree model(s) (e.g., decision trees, random forests, and gradient boosted trees) linear regression model(s), logistic regression model(s), support vector machine(s) ("SVM"), artificial intelligence device(s), or any other type of intelligent computing system. Any amount of training data may be used (and perhaps later refined) to train the machine learning algorithm to dynamically perform the disclosed operations.

In some implementations, service 105 is a cloud service operating in a cloud environment. In some implementations, service 105 is a local service operating on a local device. In some implementations, service 105 is a hybrid service that includes a cloud component that communicates with a local component. The machine learning engine can optionally be used to tune the threshold values, the probability values, the increment values, and the accuracy values.

In any event, service 105 is tasked with maintaining and managing counter 110. Although reference is made to "a" counter, it should be noted how any number of counters can be used. For instance, service 105 is able to access a file 115 comprising code 120. Any number of counters can be injected into the code 120. One, ten, fifty, hundreds, or even thousands of counters can be injected into the code.

As an example, consider the program flow diagram 200 of FIG. 2A. This program flow diagram 200 is an abstracted representation of an application's code. Notice, the diagram includes a number of processes, including start 205, processes 210, 215, 220, 225, 230, and 235, and end 240. These processes may represent methods or basic blocks within methods or other program structures of interest. The embodiments are able to inject a counter into one, some, or all of these processes to determine how often they are being called. FIG. 2B is illustrative.

FIG. 2B now shows a count associated with each process. The count represents the number of times that process was called or executed by a calling entity (e.g., a CPU, thread, application, etc.). For instance, process 210 was called 20 times; process 215 was called 12 times; process 220 was called 152 times; process 225 was called 2 times; process 230 was called 25 times; and process 235 was called 1 time. Of course, these values are all for illustrative purposes and should not be viewed as being exemplary. If the code corresponding to this diagram is to be optimized, one can readily discern that process 220 is the section of code that should likely be optimized first because it is called far more times than any of the other processes.

Returning to FIG. 1, the counters are designed to count the number of times a unit of code is executed. As generally described earlier, having information indicating the number of times a code snippet executes is useful when developers or runtime systems are tasked with optimizing code. The service 105 is able to manage each counter, which generates a corresponding count 125. This count 125 can be written (e.g., write 130) to a storage system 135, such as a file system, memory, or any data storage mechanism.

Other entities (e.g., CPUs, threads, applications, optimization programs, etc.) can then access the storage system 135 to observe the count 125. That information can then be used to facilitate various optimization 140 operations. In this manner, the disclosed embodiments provide a feedback loop 145 that allows code 120 to subsequently be optimized. This feedback loop may be entirely within the scope of one process, may involve multiple processes, may include saving the counter values from one or several executions of these processes into a file or other storage medium for use in optimizing future executions of said processes, and may include provisions for developer review and approval of the counter data.

It should be noted how each counter can be considered as a type of contended resource 150 in which multiple calling entities are attempting to use. For instance, if multiple CPUs or threads are calling the same routine, those multiple entities will all attempt to access the same counter, resulting in contention occurring between those different entities with respect to the counter. In an effort to combat or alleviate this contention, the disclosed embodiments provide an improved type of counting mechanism.

In particular, the disclosed counter 110 includes a deterministic counter 155 component and a probabilistic counter 160 component. When the deterministic counter 155 component of counter 110 is active, counter 110 can be said to be operating in a first mode 155A. When the probabilistic counter 160 component of counter 110 is active, counter 110 can be said to be operating in a second mode 160A.

As will be described in much more detail later, the counter 110 initially operates in a mode (i.e. the first mode 155A) where the count 125 is incremented or updated each time the corresponding portion of code is called or executed (i.e. in a deterministic manner). Once a first threshold 170 for that count 125 is reached, however, the embodiments switch the counter 110 from using the deterministic counter 155 component (i.e. the first mode 155A) to using the probabilistic counter 160 (i.e. the second mode 160A). Subsequently, that probabilistic counter 160 component can be further modified based on the count 125 reaching one or more subsequent threshold(s) 175. Further details on the probabilistic attributes of the counter will be provided shortly.

FIG. 3 provides a simplified example. FIG. 3 shows a graph of the counter incrementation or update process used by service 105 of FIG. 1 and in particular the counter 110. Each rectangle represents an instance in which an entity (e.g., CPU threads) makes a call to the counter.

Initially, the counter operates in a deterministic mode using its deterministic counter. While in this mode, each call to a code portion corresponding to the counter results in the count being incremented by a value of 1. Thus, the counter, when operating in the first mode, can be considered a deterministic counter. On the other hand, when the counter operates in the second mode, the counter can be considered a probabilistic counter.

For instance, the graph shows a number of points labeled "A", "B", "C", and "D" on the counter update request axis (i.e. the x-axis). This axis corresponds to the number of times an entity is calling for the counter to be updated. The graph also includes an axis labeled "count" (i.e. the y-axis); this axis corresponds to the actual value of the count.

At point "A," a first entity calls the code portion, resulting in a +1 increment to the count, as shown by the single step up in the graph at point "A." Between points "A" and "D," multiple entities called the code portion, and the counter was updated each time that code portion was called by an entity, as shown by the stepwise increments at points "1", "2", "3", and then up to point "6" on the count axis. Up to this point, the counter has been operating in the first mode. It should be noted that FIG. 3 is showing a scenario in which the thresholds for the counter are not changing by powers of 2. FIG. 3 is provided for simplified illustrative purposes. Most embodiments, though not necessarily all, update the thresholds using powers of two. In a few embodiments, the thresholds can be updated using other techniques.

Point "D6" is where a first threshold 300 (e.g., threshold 170 from FIG. 1) is reached by the count. At this threshold 300, the counter switches from using its deterministic counter 155 component to using its probabilistic counter 160 component. In other words, the counter switches from operating in the first mode to operating in the second mode. Different count values can be used as the first threshold. As some examples, the first threshold can be set to a count value of over 8,000 counts. In some cases, the first threshold is set to a count value that is over 8,000 counts and less than about 10,000 counts. In some cases, the first threshold is set to a count value that is over 5,000 counts. In some cases, the first threshold is set to a count value that is less than about 15,000 counts.

Prior to point "D6," the counter had 100% accuracy, but the overhead was increasing as the number of calls to the code portion increased, resulting in the counter performing many file system writes. With the mode transition at point "D6," the accuracy of the counter is now reduced, but the amount of overhead is also now reduced. Also, the probability of actually triggering an event where the count is increased is reduced. In this example, the counter is now incremented by a value of two, and the probability that the counter will actually be triggered to increment the count is reduced by two. In other words, the probability of the counter actually incrementing the count is now ½. The counter continues to count.

As shown by some of the counts in FIG. 3, the approximate count can, in some instances, exceed the actual count. For example, at point "E8" the count was incremented by two instead of a non-increment. As a result, the rectangle at point E rises above the actual count line. The next operation might not increment the count.

At point "G14," the count reaches a new threshold 305. The counter stays in the second, probabilistic mode, but the counter now shifts its increment processes, its accuracy, its triggering probability, and its overhead. In this example scenario, the counter will now increment by a value of four each time the counter is triggered, but the probability that the counter will actually be triggered is now ¼. Again, the accuracy is reduced, but the overhead is also reduced.

Counts gathered by Dynamic PGO have a wide dynamic range, and even when the accuracy is being checked, the points of interest are usually in relatively self-consistent counts. For example, if a simple if/then/else construct is provided, it is expected that the count for the if block will equal the sum of the counts for the then and else portions. But there are some variances that are to be considered. As some examples, the method might throw an exception, or the thread might be asynchronously stopped.

As a result, it is typically the case that a reduced level or buffer level of accuracy is acceptable. For instance, most testing scenarios are satisfied if the profile flows are accurate at each conservation point at around 1%, and a diminishing return on having results more accurate than this. Given that it is already the case that the testing platforms tolerate some inaccuracy, the embodiments leverage that to produce an "intentionally approximate counting" scheme (i.e. the scheme just described with respect to FIGS. 1, 2A, 2B, and 3) that is nearly as accurate as the interlocked implementation but with less overhead. The intentionally approximate counting scheme (aka "scaling" scheme) is significantly more accurate than the racing scheme.

The amount by which the accuracy is reduced is maintained to be within a threshold target. That is, the variance or delta between a true count and the disclosed count is kept to be within a margin of about 1-2%. FIG. 3 generally (and simply) shows a representation of what the actual count 310 would look like if the counter were triggered for each call to the corresponding code portion. That representation is shown in the form of the line labeled actual count 310.

FIG. 3 also shows a step-wise count representation (e.g., the steps defined by the tops of the combination of rectangles). Notice, this stepwise count representation is tracking the actual count 310 within a level of error (which is often set to be about 1-2%). At some instances, the actual count 310 and the stepwise count representation match exactly while in other instances there is a delta. On average, the embodiments are designed so that the difference in accuracy between the actual count 310 and the stepwise count representation is within about 2% of each other. Further details on these aspects will be provided momentarily.

Probabilistic Mode

As mentioned, the embodiments operate in multiple different modes. Until a first count threshold is reached by the counter, the embodiments operate in the first mode and increment the count once every time an entity calls the code portion in which the counter resides. After the first count threshold is reached, the embodiments transition the counter from operating in that first mode to operating in the second, probabilistic mode. In this second mode, the embodiments vary the amount by which the counter increments the count. FIG. 3 generally provided an illustration, but an additional example will be helpful.

Suppose the probabilistic mode is likened initially to a two-sided coin. Every time the coin lands on its head, the counter will increment the count by a value of two. Every time the coin lands on its tail, the counter will do nothing with regard to incrementing the count. The probability of the coin landing on its head is ½. Consequently, the probability that the counter will increment the count is ½. The counter will operate in this manner until a second count threshold is reached.

Once the second threshold is reached, then the probabilistic mode can be likened to a four-sided die. Each time the die lands on a "1", the counter will increment the count by a value of four. Each time the die lands on a value that is not "1," the counter will do nothing with regard to incrementing the count. The probability of the four-sided die landing on the "1" is ¼. Consequently, the probability that the counter will increment the count is ¼.

The counter will continue to operate in this manner until another a third count threshold is reached, then the probabilistic mode can be likened to an eight-sided die. Each time the die lands on a "1," the counter will increment the count by a value of 8. Each time the die lands on a value that is not "1," the counter will do nothing. The probability of the eight-sided die landing on the "1" is ⅛. Consequently, the probability that the counter will increment the count is ⅛.

This process can repeat itself any number of times. In this manner, the embodiments are able to repeatedly scale up the value by which the count is incremented while also scaling down the rate by which the count is actually incremented.

As mentioned before, the counter can be viewed as being a contended resource. It may be the case that a large number of processors are trying to trigger this counter, and all of those processors are competing with one another for access to the counter. The disclosed embodiments beneficially operate to reduce this contention. That is, as the count value progressively gets higher, in order to manage contention, the embodiments update the count less and less often.

The embodiments manage this probabilistic response in a manner so that the resulting count does not deviate significantly from what would be the true count, as described earlier. Notably, the amount of error that the embodiments permit for the probabilistic count can be restricted to a deviation of about 1-2%. Other accuracy deviation values can also be designed, however, by adjusting the thresholds, the probabilities, and the incremental values.

That is, it should be noted how the level of error is tunable based on the selection of the threshold values and the other values. More accuracy can be achieved by having higher threshold values. Doing so, however, will result in a higher level of overhead. Less accuracy can be achieved by having lower threshold values. Doing so will result in a lower level of overhead.

Also, one beneficial insight is that the embodiments can leverage randomization to count probabilistically. That is, once the counter value is sufficiently large, instead of always trying to update its value by 1 for each increment, the embodiments update the count by N with probability 1/N via use of a random number generator (RNG).

As the counter value grows, the embodiments update the counter less and less often, thus reducing the amount of contention counter updates cause. Additionally, the counter's expected value is the accurate count, with some controllable likelihood of the count being too large or too small.

Because the total number of updates is limited, the embodiments can use interlocked operations for the updates without unduly harming scalability.

The disclosed embodiments also operate using an integer encoding scheme, as shown by integer encoding 165 of FIG. 1. Traditionally, many counters relied on a floating-point encoding scheme. The floating-point encoding scheme was useful for many scenarios, but it resulted in additional overhead if used for a counting scenario in which the count was used for optimization purposes. That is, an additional mapping or translation was required in order to map from a floating-point interpretation to an integer interpretation, which is the interpretation that is often used when analyzing count data to determine how to optimize code.

By way of further detail, consider a scenario where standard floating-point representations for counts or a "software float" representation were used, where a part of the counter storage is an exponent and the remainder a mantissa. Those representations are not well suited for many scenarios, as described below.

The primary benefit of the exponent/mantissa form is that it makes it relatively simple to estimate the magnitude of the counter. Notably, the exponent is the integer part of the $\log_2$ of the counter value. It is possible to compute an approximately correct quantity 1/N quickly without needing to divide if the computation restricts N to a power of 2. For normal integer data, however, the embodiments can compute the same thing by simply finding the highest set bit of the data. The embodiments can then check the probability by computing the remainder left by dividing some random value by simple masks and compares. Additionally, computer systems are able to easily interpret and apply regular integer data types. As a result, there are significant benefits to operating using regular integer data types.

As one example implementation, a random number can be defined, where the random number is generated by a random operation that is a fast source of unsigned 32-bit integer (uint) sized (e.g., 0 to 4,294,967,295) random numbers, which are obtainable without synchronization (e.g., perhaps from a thread_local producer).

When the count value is below a first threshold (e.g., less than $2^{\{13\}}=8192$) the counter counts by 1. Once the value exceeds the first threshold (e.g., 8192), the counter counts randomly, first by 2 until a second threshold is reached. In this scenario, the probability of the counter counting is set to ½.

Once the second threshold is reached, then the counter counts randomly by 4 until a third threshold is reached. In this scenario, the probability of the counter counting is set to ¼. Once the third threshold is reached, then the counter counts by 8, and so on and so forth.

The parameter value of interest here is 13, which controls the relative accuracy. A higher number would give more accurate (but less scalable) counts. A smaller number would give more scalable (but less accurate) counts. This implementation is referred to herein as the "scalable" implementation.

A value of 13 with the simple and fast "xorshift" random number generator (RNG) used for Dynamic PGO empirically gives the scalable count an overall $2\sigma$ accuracy of around 2%, with worst case deviation around 3%. A better quality RNG might improve accuracy but would create more overhead. In some embodiments, the scalable implementation uses per-thread RNGs. Also, in some embodiments, each of those per-thread RNGs is seeded differently.

Inasmuch as the embodiments operate using integer encoding, the embodiments can be triggered to perform operations based on different power of two levels, as described above. That is, the embodiments are able to compute the base two logarithm of a number or rather, the embodiments determine what is the closest power of two to a desired threshold number that is equal to or less than this number. An example will be helpful. Suppose the first threshold is set to a counter value of 8192.

The value 8192 happens to be 2 to the 13th power. The logarithm base two of 8192 is 13. The embodiments can monitor the counter, and when the counter gets to this first threshold, the embodiments can determine that it is time to switch modes. Now, the counter is to operate in the probabilistic mode. Subsequently, the counter can switch its increment rate when the counter value reaches every power of two threshold after that.

To continue the example, after that first threshold (e.g., 8192) is reached, the embodiments double the increment but half the probability of actually triggering an increment event. That is, the likelihood of the counter actually incrementing the count is now $\frac{1}{2}$.

When the count reaches the next power of two, which is 16384, the embodiments can start incrementing by four with probability $\frac{1}{4}$. When the count reaches the next power of two, which is 32768, the embodiments increment by 8 with the probability of $\frac{1}{8}$. The embodiments scale up in this manner.

By stepping or scaling up in this manner, the embodiments are able to control the growth of the error. If the counter is very contended, the embodiments almost never update the count. When it is updated, however, the increment for that update is very large. As an example, if the count has reached the millions value, even an increment of 1,000 will result in an error rate that is around 1%.

By way of further explanation as to why the integer encoding scheme is beneficial, the embodiments use this scheme to control how the count is updated. That is, as the count value become larger, the embodiments trigger various changes in how the count is updated (e.g., by switching modes). The integer encoding scheme is the mechanism by which the embodiments determine how to update the incrementation of the count.

The embodiments rely on an efficient way to compute the log base two of an integer. For instance, consider an integer number as viewed in binary form, such as a 32-bit number. This binary number will often include a number of leading zeros and then some combination of ones and zeroes. The smaller the integer number, the more leading zeros there will be. For example, the integer value "1" will have 31 leading zeros and then a one bit. The number 2 will have 30 leading zeros, a one bit, then a zero bit. The embodiments are able to count the number of leading zeros. The log base two determination relies on the count of the number of leading zeroes. That is, the number of leading zeroes can be used to determine what the integer part of the log base two of a number is. Such a process can be performed to select the thresholds.

The powers of two computation is also used to update the counter value in accordance with a defined probability metric. To determine the probability metric, the embodiments generate a random number that generates an integer value, such as a 32-bit integer. The random number generator (RNG) randomly sets the ones and zeros for that 32-bit integer in a random manner to thereby generate the number. Each time the RNG is triggered, it generates a new, random bit pattern.

The embodiments determine a probability, say $\frac{1}{2}$. The probability of $\frac{1}{2}$ in the disclosed context corresponds to an increment rate of two to the first power. The embodiments look at any one specific bit in the 32-bit sequence and then pick any bit (e.g., perhaps the $17^{th}$ bit). The embodiments examine the selected bit to determine if it has a value of one. That same bit is then consulted during different iterations. More generally, any sub-sequence of N bits uniformly represents one of $2^N$ possible random patterns. Thus, all those N bits are zero with probability $\frac{1}{2}^N$, so a simple test of those N bits versus all zeros can be used to check if the probability determination is satisfactory at each successive threshold for counting. So, the embodiments are able to efficiently do that probabilistic check using the random number generator. The power of two scheme thus provides at least two benefits. One, it allows the embodiments to very quickly compute the integer part of the log. Two, it allows the embodiments to very quickly compute the probability.

It should be noted how the value by which the embodiments increment and the probability are reciprocals of one another. If the increment is by a value of 2, then the probability of incrementing is $\frac{1}{2}$. In terms of statistical distribution, the expected value of any given update will be the value of the update times the probability update. So, if the increment is by a value of two with a probability of $\frac{1}{2}$, then the expected value is a value of 1, on average.

In terms of computer processing, it is not desirable to perform a division operation. Performing operations using the power of two, on the other hand, can be performed quickly and efficiently. As a result, the embodiments capitalize on the benefits of operating using the integer encoding scheme and the power of two scheme.

It should also be noted how using the power of twos scheme is often the bit interpretation scheme used by computers. Inasmuch as most computers already operate using that scheme, the embodiments can avoid implementing an additional mapping mechanism, which may be required if, for example, a floating-point scheme were used. Additionally, entities that are calling on the count value often rely on the same integer encoding scheme to interpret the meaning behind the bit pattern. As a result, those calling entities also do not need an additional translation mechanism. Consequently, the embodiments further reduce the level of overhead associated with the counter. Further details on these aspects will now be provided.

Performance Comparisons

A simulation was developed to compare the three approaches mentioned earlier: racing, interlocked, and the disclosed "scalable" (i.e. the "intentionally approximate counting" scheme). As noted, interlocked is perfectly accurate. If the three implementations were compared, the results are shown in FIG. 4.

Figure 4:
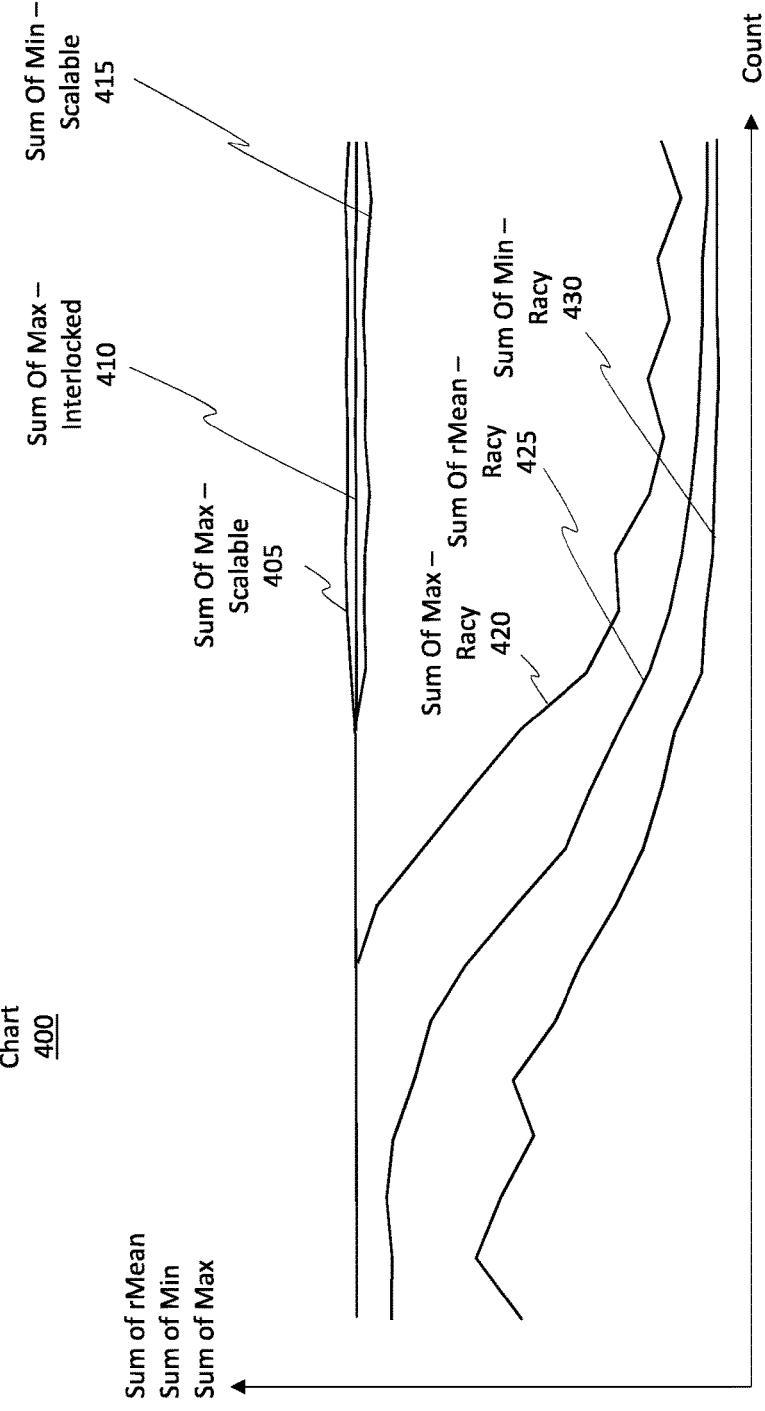

In FIG. 4, the X axis is the intended final value of the count, where counting is done by processor threads, each doing nothing more than incrementing the counter. The Y axis shows the mean counter value along with max and min values, scaled by the total expected count. As expected, the interlocked implementation is just a horizontal line at Y=1.0. FIG. 4 shows a chart 400 comprising a number of plots, which include plots 405, 410, 415, 420, 425, and 430.

The racing/racy implementation is losing counts even with a small final count of 12, as shown by plots 420, 425, and 430. The loss percentage gets worse the higher the count increases, ending up with at best 20% of the final count value.

The scalable implementation (e.g., plots 405 and 415) is perfectly accurate up to the first threshold (e.g., 8192). Then, this implementation starts to deviate somewhat, but the total relative deviation remains constrained.

Figure 5:
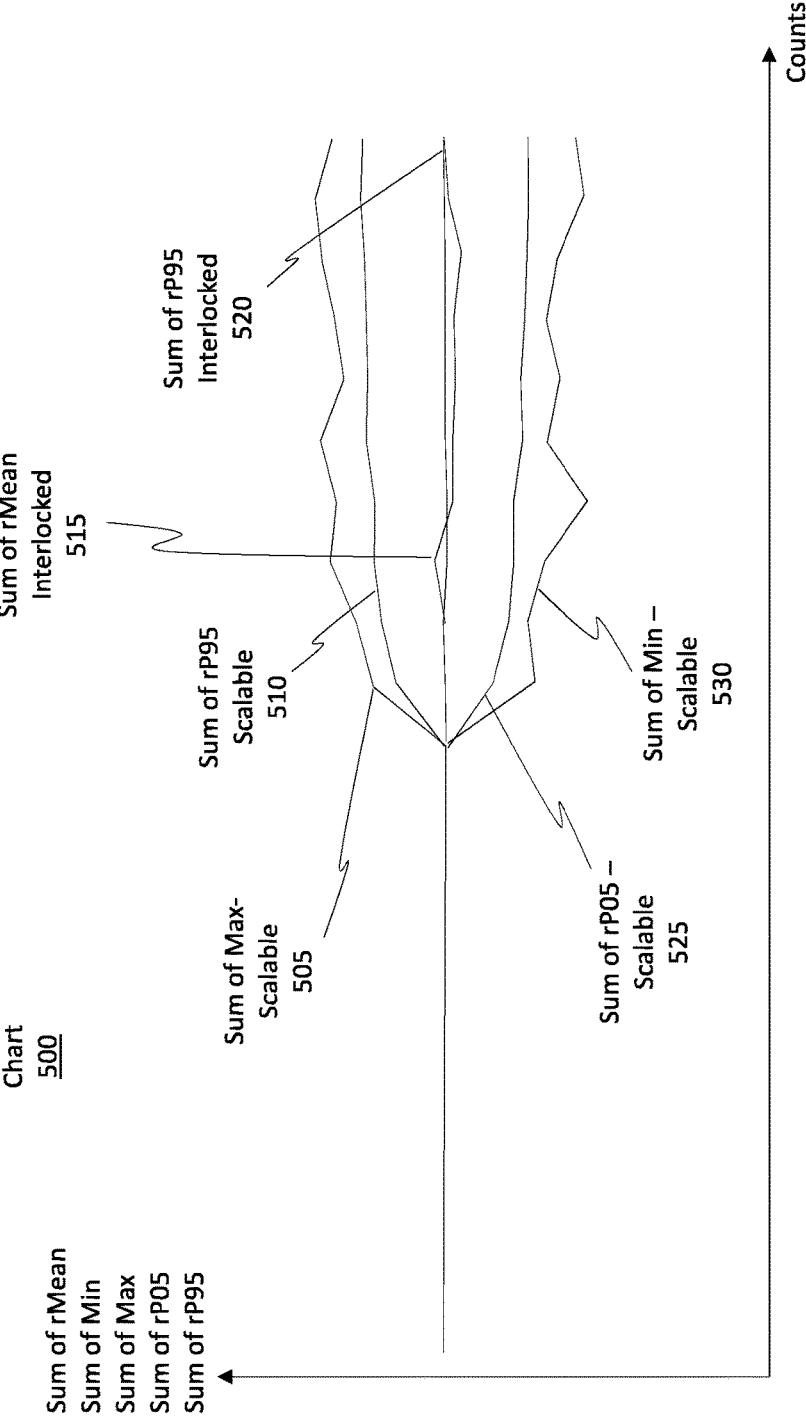

If the racing implementation were removed from the graph, and the graph was zoom in, as shown by chart 500 of FIG. 5, one can observe how the error is indeed 2% for the 5/95 spread, and 3% for worst case, and that on average the count is very accurate. Chart 500 includes plots 505, 510, 515, 520, 525, and 530.

Figure 6:
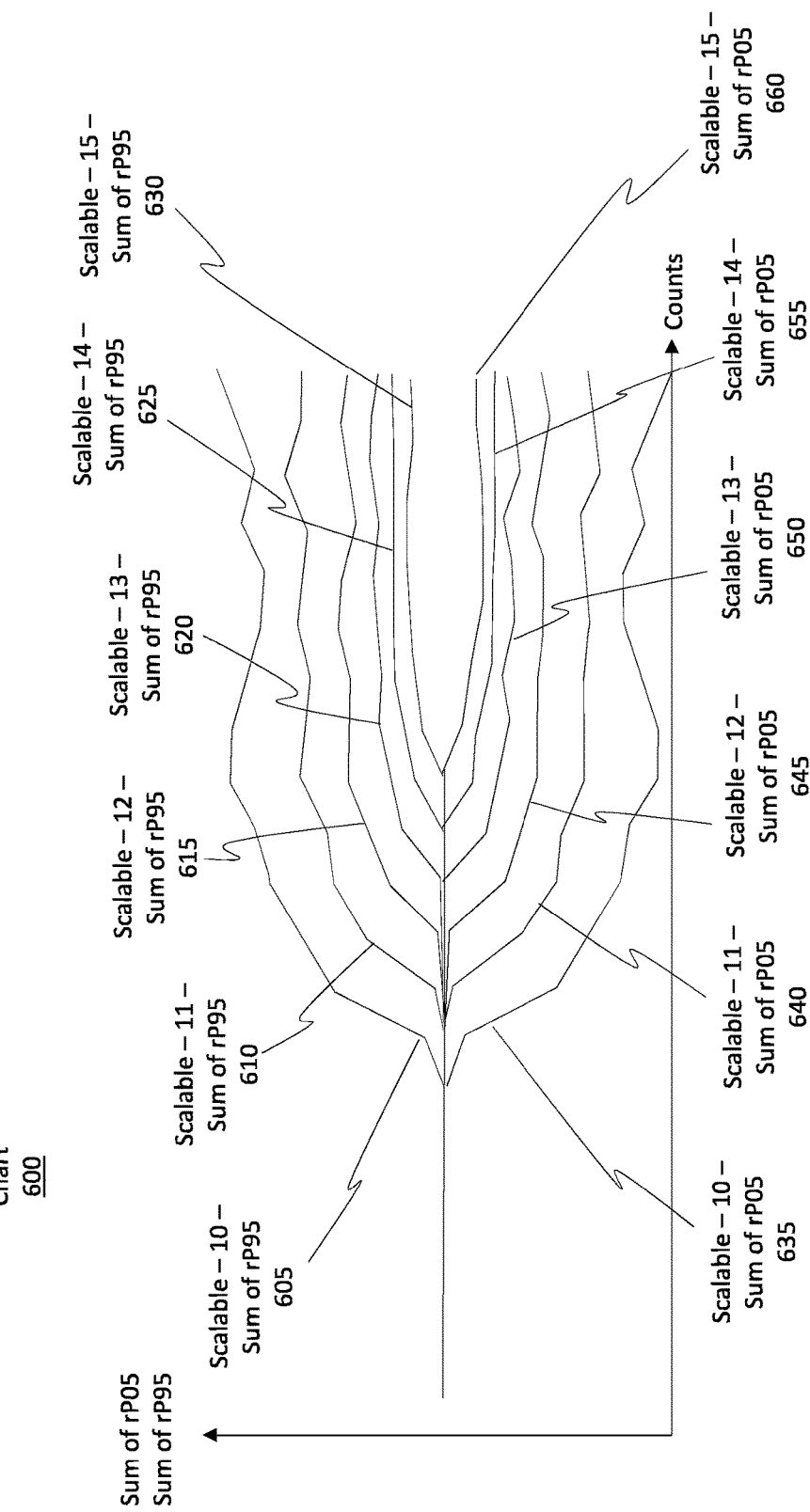

It is also possible to adjust the accuracy by changing the first threshold setpoint, which is the point where the embodiments switch to probabilistic counting. The higher the switchover point, the more accurate the results are overall. As shown by chart 600 of FIG. 6, the testing scenarios varied the switchover point from $2^{\{10\}}$ to $2^{\{15\}}$. FIG. 6 shows the plots (e.g., plots 605, 610, 615, 620, 625, 630, 635, 640, 645, 650, 655, and 660) of the 5th and 95th percentiles relative to the accurate count.

Figure 7:
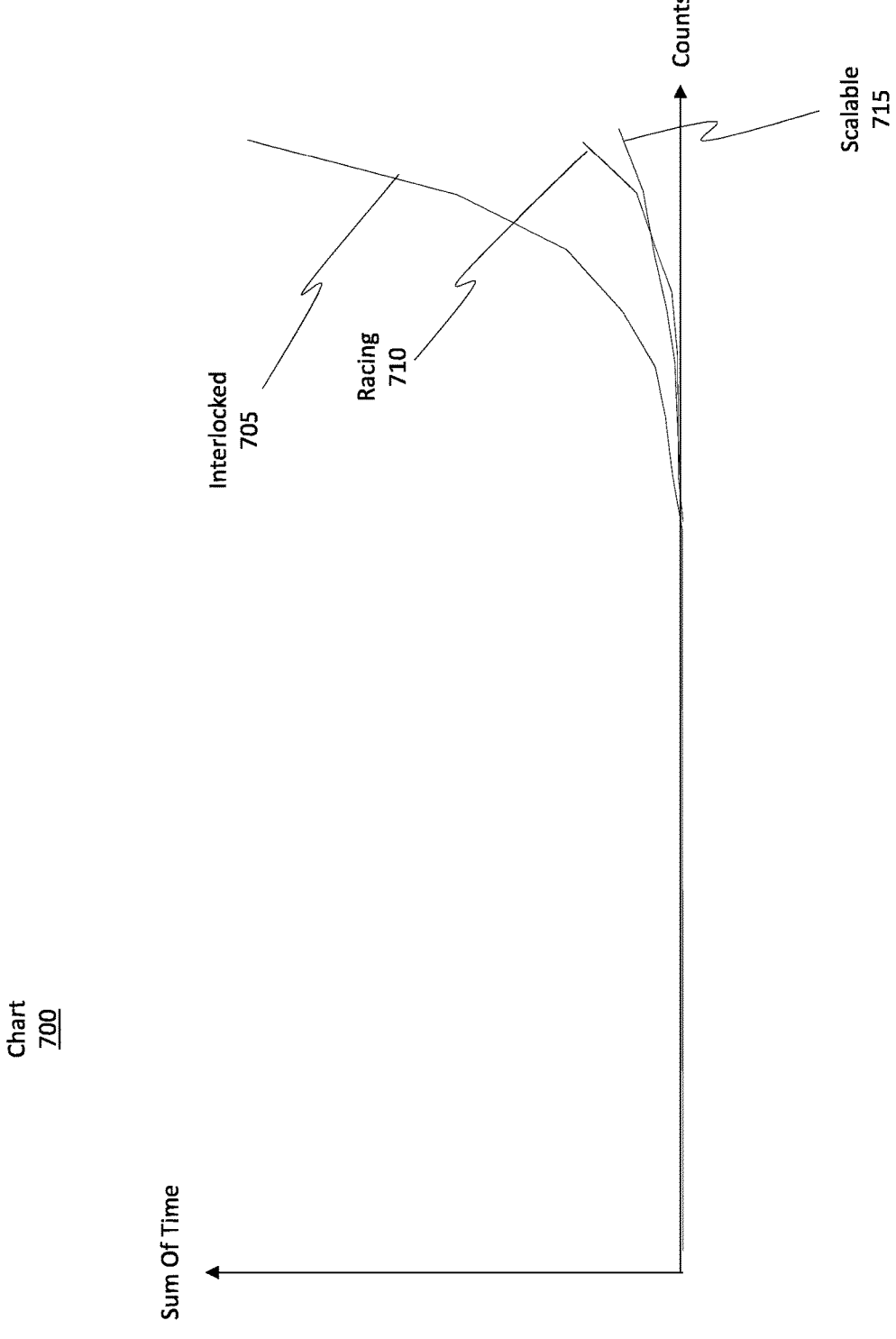

Benchmarking the same set of computations, the data shown in chart 700 of FIG. 7 was observed, as shown by plots 705, 710, and 715. Here, the switchover is at a count of 8192. What this means is that the scalable implementation and the racing implementation have similar costs while the interlocked implementation becomes quite a bit more costly at high counts.

Mathematically, it is possible to model the scalable update distribution as a binomial distribution. Also, if N counter updates are made with probability P, the expected number of updates is NP and the standard deviation in the number of updates is $\sqrt{NP(1-P)}$. Therefore, if the embodiments start probabilistically incrementing by 2 with probability ½ at 8192 and thereafter use probabilistic updates, the embodiments have added an expected value of 8192*2*½=8192 to the counter.

The variance in the actual number of updates is $\sqrt{2^{\{13\}}*½*(1-½)}=\sqrt{2^{\{11\}}}\approx 45$. Each update is by 2, so the two standard deviation expected range for the change in the counter value is 2*2*45 \approx 180. The relative error range is thus \pm 180/8192 \approx \pm 0.022, which is a reasonable value.

As the count becomes higher, the standard deviation is limited by $\sigma \approx \sqrt{NP}$, so when the embodiments can double N and halve P. The variance $\sigma$ remains roughly the same overall. If (via the benchmark), one were to look at how tunable the scalability is, one would see that the higher the threshold for switching to probabilistic counting, the higher the cost but with better accuracy, as shown in FIG. 7.

This technique was then implemented within the runtime and JIT, encoding the logic above as a new helper call. Trying this out on certain benchmarks, where the benchmark was forced to execute Tier0 instrumented code, significant improvements in server metrics were observed, as shown in table 800 of FIG. 8.

In normal processing, the extra accuracy from the scalable implementation provides some additional benefits to the Tier1 code as well, as shown in the table 900 of FIG. 9.

Example Methods

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Attention will now be directed to FIG. 10, which illustrates a flowchart of an example method 1000 for implementing an intentionally approximate counting scheme. Method 1000 can be implemented in the architecture 100 of FIG. 1. More particularly, method 1000 can be implemented by the service 105 of FIG. 1.

Method 1000 includes an act (act 1005) of accessing a counter that is included in a portion of code. The counter is structured to update a count that is approximately representative of a number of times the code portion is called. Any number of calling entities (e.g., CPUs, threads, etc.) can call the code portion. By "approximately representative," it is meant that the delta between what would otherwise be the actual count value and the current count value is within a permissible tolerance level of one another (e.g., often between about 1-2%).

Act 1010 includes causing the counter to operate in a first mode. The first mode is a mode in which the counter updates the count by a value of 1. Also, while the counter is operating in the first mode, a probability by which the counter updates the count is set to a value of 1. As a result, the counter updates the count each time the code portion is called or executed.

Act 1015 includes determining the count has reached a first threshold. This act is performed while the counter was counting in the first mode.

Act 1020 includes causing the counter to switch from operating in the first mode to operating in a second mode. The second mode is a mode in which the counter updates the count by a value of N, where N is an integer larger than 1. Also, while the counter is operating in the second mode, the probability by which the counter updates the count is set to a value of 1/N. Therefore, despite multiple calls being made to the code portion, the count is updated in accordance with the 1/N probability.

Act 1025 includes causing the counter, which is now in the second mode, to continue to update the count. Now, the count is updated in accordance with the 1/N probability. Also, the counter updates the count by the value of N.

Each time the count is updated, a value of the count is written to a storage system. For instance the value can be written to memory or to a file system. Setting the thresholds, the probability, the increment value, and the accuracy can all be facilitated via use of the integer encoder scheme, as described earlier.

Example Computer/Computer Systems

Attention will now be directed to FIG. 11 which illustrates an example computer system 1100 that may include and/or be used to perform any of the operations described herein. Computer system 1100 can implement the service 105 of FIG. 1.

Computer system 1100 may take various different forms. For example, computer system 1100 may be embodied as a tablet, a desktop, a laptop, a mobile device, or a standalone device, such as those described throughout this disclosure. Computer system 1100 may also be a distributed system that includes one or more connected computing components/devices that are in communication with computer system 1100.

In its most basic configuration, computer system 1100 includes various different components. FIG. 11 shows that computer system 1100 includes a processor system 1105 comprising one or more processor(s) (aka a "hardware processing unit") and a storage system 1110.

Regarding the processor(s) of the processor system 1105, it will be appreciated that the functionality described herein can be performed, at least in part, by one or more hardware logic components. For example, and without limitation, illustrative types of hardware logic components/processors that can be used include Field-Programmable Gate Arrays ("FPGA"), Program-Specific or Application-Specific Integrated Circuits ("ASIC"), Program-Specific Standard Products ("ASSP"), System-On-A-Chip Systems ("SOC"), Complex Programmable Logic Devices ("CPLD"), Central Processing Units ("CPU"), Graphical Processing Units ("GPU"), or any other type of programmable hardware.

As used herein, the terms "executable module," "executable component," "component," "module," "service," or "engine" can refer to hardware processing units or to software objects, routines, or methods that may be executed on computer system 1100. The different components, modules, engines, and services described herein may be implemented as objects or processors that execute on computer system 1100 (e.g. as separate threads).

Storage system 1110 may include physical system memory, which may be volatile, non-volatile, or some combination of the two. The term "memory" may also be used herein to refer to non-volatile mass storage such as physical storage media. If computer system 1100 is distributed, the processing, memory, and/or storage capability may be distributed as well.

Storage system 1110 is shown as including executable instructions 1115. The executable instructions 1115 represent instructions that are executable by the processor(s) of computer system 1100 to perform the disclosed operations, such as those described in the various methods.

The disclosed embodiments may comprise or utilize a special-purpose or general-purpose computer including computer hardware, such as, for example, one or more processors and system memory, as discussed in greater detail below. Embodiments also include physical and other computer-readable media for carrying or storing computer-executable instructions and/or data structures. Such computer-readable media can be any available media that can be accessed by a general-purpose or special-purpose computer system. Computer-readable media that store computer-executable instructions in the form of data are "physical computer storage media" or a "hardware storage device." Furthermore, computer-readable storage media, which includes physical computer storage media and hardware storage devices, exclude signals, carrier waves, and propagating signals. On the other hand, computer-readable media that carry computer-executable instructions are "transmission media" and include signals, carrier waves, and propagating signals. Thus, by way of example and not limitation, the current embodiments can comprise at least two distinctly different kinds of computer-readable media: computer storage media and transmission media.

Computer storage media (aka "hardware storage device") are computer-readable hardware storage devices, such as RAM, ROM, EEPROM, CD-ROM, solid state drives ("SSD") that are based on RAM, Flash memory, phase-change memory ("PCM"), or other types of memory, or other optical disk storage, magnetic disk storage or other magnetic storage devices, or any other medium that can be used to store desired program code means in the form of computer-executable instructions, data, or data structures and that can be accessed by a general-purpose or special-purpose computer.

Computer system 1100 may also be connected (via a wired or wireless connection) to external sensors (e.g., one or more remote cameras) or devices via a network 1120. For example, computer system 1100 can communicate with any number devices or cloud services to obtain or process data. In some cases, network 1120 may itself be a cloud network. Furthermore, computer system 1100 may also be connected through one or more wired or wireless networks to remote/separate computer systems(s) that are configured to perform any of the processing described with regard to computer system 1100.

A "network," like network 1120, is defined as one or more data links and/or data switches that enable the transport of electronic data between computer systems, modules, and/or other electronic devices. When information is transferred, or provided, over a network (either hardwired, wireless, or a combination of hardwired and wireless) to a computer, the computer properly views the connection as a transmission medium. Computer system 1100 will include one or more communication channels that are used to communicate with the network 1120. Transmissions media include a network that can be used to carry data or desired program code means in the form of computer-executable instructions or in the form of data structures. Further, these computer-executable instructions can be accessed by a general-purpose or special-purpose computer. Combinations of the above should also be included within the scope of computer-readable media.

Upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a network interface card or "NIC") and then eventually transferred to computer system RAM and/or to less volatile computer storage media at a computer system. Thus, it should be understood that computer storage media can be included in computer system components that also (or even primarily) utilize transmission media.

Computer-executable (or computer-interpretable) instructions comprise, for example, instructions that cause a general-purpose computer, special-purpose computer, or special-purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the embodiments may be practiced in network computing environments with many types of computer system configurations, including personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The embodiments may also be practiced in distributed system environments where local and remote computer systems that are linked (either by hardwired data links, wireless data links, or by a combination of hardwired and wireless data links) through a network each perform tasks (e.g. cloud computing, cloud services and the like). In a distributed system environment, program modules may be located in both local and remote memory storage devices.

The present invention may be embodied in other specific forms without departing from its characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computer system that implements an intentionally approximate counting scheme, said computer system comprising:

a processor system; and a storage system that stores instructions that are executable by the processor system to cause the computer system to:

access a counter that is included in a portion of code, wherein the counter is structured to update a count that is approximately representative of a number of times the code portion is called or executed, and wherein the code portion is called or executed by a central processing unit (CPU);

cause the counter to operate in a first mode, wherein the first mode is a mode in which the counter updates the count by a value of 1, and wherein, while the counter is operating in the first mode, a probability by which the counter updates the count is set to a value of 1 such that the counter updates the count each time the code portion is called or executed;

determine the count has reached a first threshold while the counter is operating in the first mode;

cause the counter to switch from operating in the first mode to operating in a second mode, wherein the second mode is a mode in which the counter updates the count by a value of N, where N is an integer larger than 1, and wherein, while the counter is operating in the second mode, the probability by which the counter updates the count is set to a value of 1/N such that, despite multiple calls being made to the code portion, the count is updated in accordance with the 1/N probability;

cause the counter, which is now in the second mode, to continue to update the count, wherein the count is updated in accordance with the 1/N probability, and wherein the counter updates the count by the value of N; and write, each time the count is updated, a value of the count to the storage system.

2. The computer system of claim 1, wherein the code portion is called or executed by a thread.

3. The computer system of claim 1, wherein the count is approximately representative of the number of times the code portion is called or executed when the count is within a determined tolerance level of the number of times the code portion is called or executed.

4. The computer system of claim 3, wherein the determined tolerance level is between about 1-2%.

5. The computer system of claim 1, wherein the counter is one of a plurality of counters that are included in the code.

6. The computer system of claim 5, wherein a number of counters included in the plurality of counters exceeds 50.

7. The computer system of claim 1, wherein the code is subsequently optimized.

8. The computer system of claim 1, wherein the counter is a contended resource in which multiple calling entities are attempting to use.

9. The method of claim 1, wherein the code portion is called or executed by a central processing unit.

10. The method of claim 1, wherein the counter, when operating in the first mode, is a deterministic counter.

11. The method of claim 1, wherein the counter, when operating in the second mode, is a probabilistic counter.

12. The method of claim 1, wherein the first threshold is set to a count value of over 8,000 counts.

13. The method of claim 1, wherein the first threshold is set to a count value that is over 8,000 counts and less than 10,000 counts.

14. The method of claim 1, wherein the first threshold is set to a count value that is over 5,000 counts.

15. The method of claim 1, wherein the first threshold is set to a count value that is less than 15,000 counts.

16. A method for implementing an intentionally approximate counting scheme, said method comprising:

accessing a counter that is included in a portion of code, wherein the counter is structured to update a count that is approximately representative of a number of times the code portion is called or executed;

causing the counter to operate in a first mode, wherein the first mode is a mode in which the counter updates the count by a value of 1, and wherein, while the counter is operating in the first mode, a probability by which the counter updates the count is set to a value of 1 such that the counter updates the count each time the code portion is called or executed;

determining the count has reached a first threshold while the counter is operating in the first mode;

causing the counter to switch from operating in the first mode to operating in a second mode, wherein the second mode is a mode in which the counter updates the count by a value of N, where N is an integer larger than 1, and wherein, while the counter is operating in the second mode, the probability by which the counter updates the count is set to a value of 1/N such that, despite multiple calls being made to the code portion, the count is updated in accordance with the 1/N probability;

causing the counter, which is now in the second mode, to continue to update the count, wherein the count is updated in accordance with the 1/N probability, and wherein the counter updates the count by the value of N; and writing, each time the count is updated, a value of the count to a storage system.

17. The method of claim 16, wherein the counter is one of a plurality of counters that are included in the code, and wherein a number of counters included in the plurality of counters exceeds 100.

18. A computer system comprising:

a processor system; and a storage system that stores instructions that are executable by the processor system to cause the computer system to:

access a counter that is included in a portion of code, wherein the counter is structured to update a count that is approximately representative of a number of times the code portion is called or executed;

cause the counter to operate in a first mode, wherein the first mode is a mode in which the counter updates the count by a value of 1, and wherein, while the counter is operating in the first mode, a probability by which the counter updates the count is set to a value of 1 such that the counter updates the count each time the code portion is called or executed;

determine the count has reached a first threshold while the counter is operating in the first mode;

cause the counter to switch from operating in the first mode to operating in a second mode, wherein the second mode is a mode in which the counter updates the count by a value of N, where N is an integer larger than 1, and wherein, while the counter is operating in the second mode, the probability by which the counter updates the count is set to a value of 1/N such that, despite multiple calls being made to the code portion, the count is updated in accordance with the 1/N probability;

cause the counter, which is now in the second mode, to continue to update the count, wherein the count is updated in accordance with the 1/N probability, and wherein the counter updates the count by the value of N; and write, each time the count is updated, a value of the count to the storage system.

19. The computer system of claim 18, wherein the counter is a contended resource.

20. The computer system of claim 18, wherein the counter, when operating in the first mode, is a deterministic counter.

\* \* \* \* \*